(12) United States Patent
Du

(10) Patent No.: US 9,706,115 B2
(45) Date of Patent: Jul. 11, 2017

(54) METHOD AND APPARATUS FOR SELECTING TARGET IMAGE

(71) Applicant: Hisense Mobile Communications Technology Co., Ltd., Qingdao, Shandong (CN)

(72) Inventor: Wenjuan Du, Shandong (CN)

(73) Assignee: Hisense Mobile Communications Technology Co., Ltd., Qingdao, Shandong (CN)

( * ) Notice: Subject to any disclaimer, the term of this patent is extended or adjusted under 35 U.S.C. 154(b) by 0 days.

(21) Appl. No.: 15/041,658

(22) Filed: Feb. 11, 2016

(65) Prior Publication Data

US 2016/0241790 A1    Aug. 18, 2016

(30) Foreign Application Priority Data

Feb. 15, 2015    (CN) .......................... 2015 1 0081729

(51) Int. Cl.
*H04N 5/232*    (2006.01)
*H04N 5/235*    (2006.01)

(52) U.S. Cl.
CPC ....... *H04N 5/23229* (2013.01); *H04N 5/2356* (2013.01); *H04N 5/23212* (2013.01)

(58) Field of Classification Search
CPC ........... H04N 5/23229; H04N 5/23212; H04N 5/2356
See application file for complete search history.

(56) References Cited

U.S. PATENT DOCUMENTS

| | | | |
|---|---|---|---|
| 2010/0039532 A1* | 2/2010 | Galstian ............... | H04N 5/2254 348/231.99 |
| 2015/0138380 A1* | 5/2015 | Tsubaki ................ | H04N 5/144 348/208.1 |
| 2016/0360091 A1* | 12/2016 | Lindskog .............. | H04N 5/357 |

* cited by examiner

*Primary Examiner* — Tuan Ho
(74) *Attorney, Agent, or Firm* — Brinks Gilson & Lione

(57) ABSTRACT

The present disclosure provides a method and apparatus for selecting target image. The apparatus is configured to drive the imaging hardware to obtain a plurality of frames of images of a scene including at least one object, each of the plurality of frames of images is associated with a character distance of a plurality of character distances of the electronic device. For each frame of the plurality of frames of images, the apparatus is configured to calculate sharpness of the frame of image; and when the sharpness exceeds a preset sharpness threshold, select the frame of image as a target image. Finally, the apparatus is configured to display at least one of the target image to a user of the electronic device.

20 Claims, 2 Drawing Sheets

METHOD AND APPARATUS FOR SELECTING TARGET IMAGE

PRIORITY STATEMENT

This application claims the priority benefit of Chinese Patent Application No. 201510081729.0 filed on Feb. 15, 2015, the disclosure of which is incorporated herein in its entirety by reference.

BACKGROUND

Technical Field

The present disclosure relates to the field of image technologies, and in particular, to a method for selecting target image and an apparatus for selecting target image.

Related Art

With the rapid development of science and technology, electronic devices have become an integral part of people's lives. That being said, electronic devices are widely popularized and usages of the electronic devices in people's working, studying, daily communication, and other aspects become higher and higher.

For an electronic device that can make images, when a user needs to make one-frame image for a object, the user needs to run an image application in an electronic device (e.g., a camera or a smart phone) and drive imaging hardware to make the image. When the user is not satisfied with the obtained image, another one-frame image needs to be made for the object, so the user needs to start the image application and drive the imaging hardware again, which is a complicated operation and cost a lot of time.

SUMMARY

Through exemplary embodiments, the present disclosure provides a solution of the above technical problem through a method for selecting target image, so as to improve operation simplicity and shorten operation time thereof.

Correspondingly, exemplary embodiments of the present disclosure also provide apparatuses for selecting target image to ensure the implementation and application of the foregoing method.

Embodiments of the present disclosure disclose the following methods and devices to solve the foregoing problem:

According to an aspect of the present disclosure, an electronic device may comprise imaging hardware; a storage medium including a set of instructions for generating image data; and a processor in communication with storage medium. When executing the set of instructions, the processor is directed to drive the imaging hardware to obtain a plurality of frames of images of a scene including at least one object, each of the plurality of frames of images is associated with a character distance of a plurality of character distances of the electronic device. for each frame of the plurality of frames of images, the processor is directed to calculate sharpness of the frame of image; and when the sharpness exceeds a preset sharpness threshold, select the frame of image as a target image. Finally, the processor is directed to display at least one of the target image to a user of the electronic device.

According to another aspect of the present disclosure, a method for selecting a target image may comprise: obtaining, by imaging hardware of an electronic device, a plurality of frames of images of a scene including at least one object, each of the plurality of frames of images is associated with a character distance of a plurality of character distances of the electronic device; for each frame of the plurality of frames of images, calculating, by the electronic device, sharpness of the frame of image in the second focal region; and when the sharpness exceeds a preset sharpness threshold, selecting, by the electronic device, the frame of image as a target image; and displaying, by the electronic device, at least one of the target image to a user of the electronic device.

Compared with the existing technology, the exemplary embodiments of the present disclosure include the following advantages:

In the exemplary embodiments of the present disclosure, when a request to generate image is received, imaging hardware is driven to use multiple character distances to generate the plurality of frames of image for a object; when a first focal region is determined in the displayed image, a second focal region associated with the first focal region in each frame of the image is searched; and image of which the sharpness coefficient exceeds a preset sharpness threshold is selected to obtain target image; and an electronic device generates one or more frames of image at once, and then obtains the target image based on a candidate region. During this process, a user may select different character distances in the image by implementing only one generation operation, and does not need to start the image application and drive the imaging hardware again, thereby significantly improving operation simplicity and shortening operating time.

DETAILED DESCRIPTION

To make the objectives, characteristics, and advantages of the present disclosure clearer, the following further describes the present disclosure in detail with reference to the accompanying drawings and specific exemplary embodiments.

Figure 3:
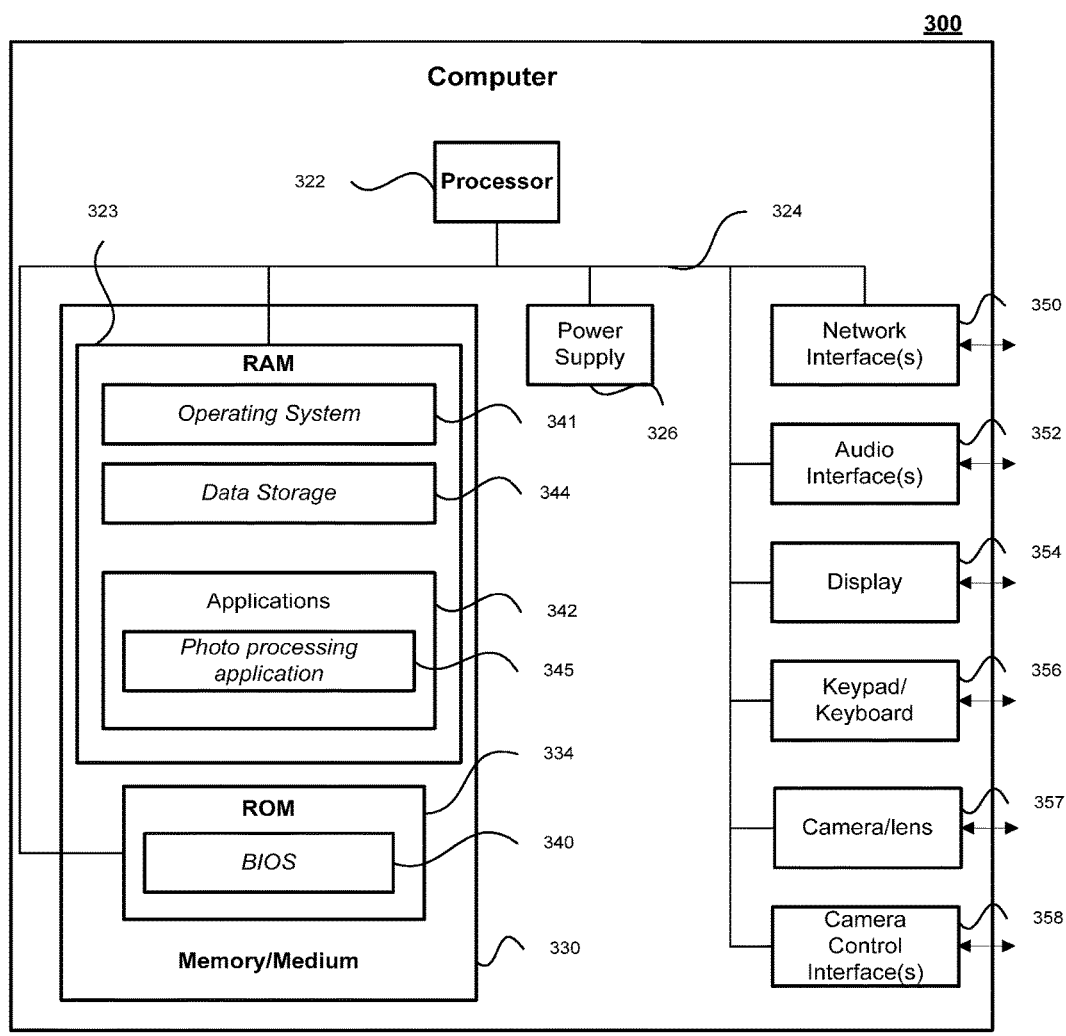
FIG. 3 is a schematic diagram illustrating an example embodiment of an apparatus embodiment for selecting target image.

FIG. 3 is a schematic diagram illustrating an example embodiment of an apparatus embodiment for selecting target image as introduced in the present disclosure. The apparatus may execute methods and software systems introduced in the present disclosure. An apparatus 300 may be a computing device capable of executing a software system. The apparatus 300 may, for example, be a device such as a personal desktop computer or a portable device, such as a camera, a laptop computer, a tablet computer, a cellular telephone, or a smart phone.

The apparatus 300 may vary in terms of capabilities or features. Claimed subject matter is intended to cover a wide range of potential variations. For example, the apparatus 300 may include am image processing hardware, such as a camera and/or a webcam 357. It may also include a keypad/keyboard 356 and a display 354, such as a liquid crystal display (LCD), or a display with a high degree of functionality, such as a touch-sensitive color 2D or 3D display. In contrast, however, as another example, a web-enabled apparatus 300 may include one or more physical or virtual keyboards, and mass storage medium 330.

The apparatus 300 may also include or may execute a variety of operating systems 341. The apparatus 300 may include or may execute a variety of possible applications 342, such as a photo processing application 345. An application 342 may enable communication with other devices via a network, such as communicating with another computer or apparatus 300 via a network.

Further, the apparatus 300 may include one or more non-transitory processor-readable storage media 330 and one or more processors 322 in communication with the non-transitory processor-readable storage media 330. For example, the non-transitory processor-readable storage media 330 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 330 may store sets of instructions, or units and/or modules that include the sets of instructions, for conducting operations and/or method steps described in the present disclosure. Alternatively, the units and/or modules may be hardware disposed in the apparatus 300 configured to conduct operations and/or method steps described in the present disclosure. The one or more processors may be configured to execute the sets of instructions and perform the methods and/or operations in example embodiments of the present disclosure.

Merely for illustration, only one processor will be described in apparatuses that execute operations and/or method steps in the following example embodiments. However, it should be note that the apparatuses in the present disclosure may also include multiple processors, thus operations and/or method steps that are performed by one processor as described in the present disclosure may also be jointly or separately performed by the multiple processors. For example, if in the present disclosure a processor of an apparatus executes both step A and step B, it should be understood that step A and step B may also be performed by two different processors jointly or separately in the apparatus (e.g., the first processor executes step A and the second processor executes step B, or the first and second processors jointly execute steps A and B).

The present disclosure relates to devices, systems, and methods for selecting target image when taking an image. According to exemplary embodiments of the present disclosure, when a user instructs/sends a request to the system and/or device to take a picture of a scene, the device and/or system may obtain a plurality of images for the user instead of one. When taking each of the plurality of images, the device and/or system may control/operate its lens according to one of a series of different character distances. For example, the device and/or system may focus its lens to one of a series of different focal planes every time it takes an image. Since focal plane at different distance to a lens often corresponds with different depth of fields, the device and/or system may generate pictures with different depth of fields. The device and/or system may operate the lens to take the plurality of pictures under the series of character distances and by taking the series of character distances one by one forward, backward, or under a predetermined order. The device and/or system may also identify the sharpest area in each image. This plurality of images may then be provided to the user as candidate images for selection.

Figure 1:
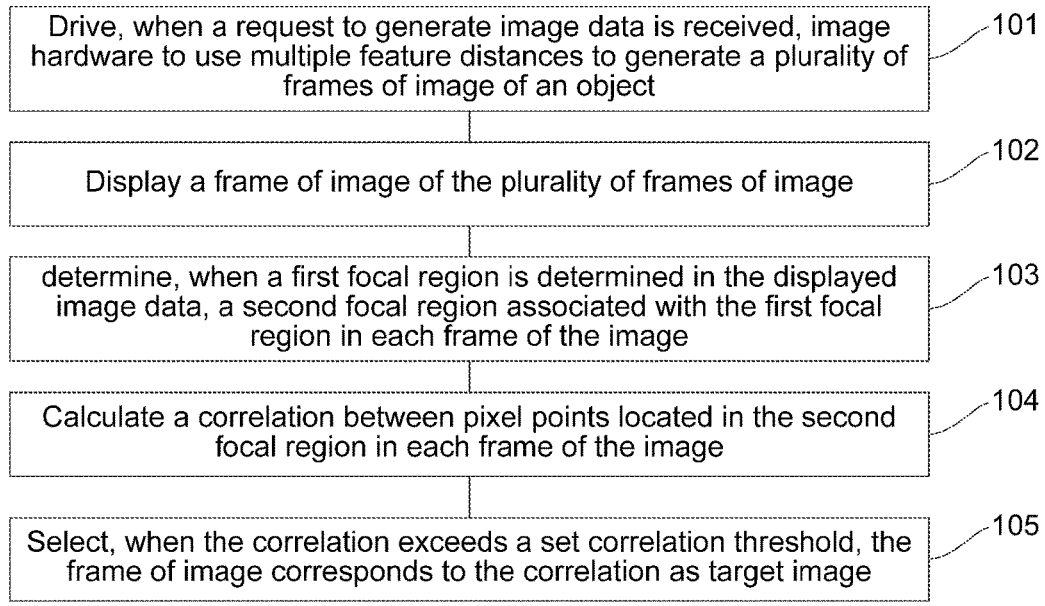
FIG. 1 is a flowchart of steps of a method embodiment for selecting target image according to the present disclosure.

FIG. 1 shows a flowchart of a method embodiment for selecting target image according to the present disclosure. The method may be implemented as a set of instructions and stored in the storage medium 330 of the apparatus 300. The processor 322 may execute the set of instructions to perform operations of the method. The operations may include:

Step 101: When receiving a request to generate image, driving imaging hardware to use multiple character distances to generate a plurality of frames of image for an object.

Here, the apparatus 300 may be an electronic terminal device having imaging hardware, which may includes a mobile phone, a tablet, a personal digital assistant (PDA), a laptop computer, and the like, which is not limited in the embodiment of the present disclosure.

These electronic terminals may support operating systems such as Windows, Android, iOS, Windows Phone, and the like. Generally, these electronic terminal devices may run image applications that can drive the imaging hardware.

In an implementation, the imaging hardware may have an image sensor and an optical component. The optical component may transmit optical image information to the image sensor, and the image sensor may be a sensor that senses the optical image information and converts the optical image information to an available output signal.

The image sensor may be classified into charge coupled device (CCD) and complementary metal-oxide semiconductor (CMOS) based on different elements.

The optical component may be referred to a component configured to receive an optical object and adjust the optical object to implement optical imaging. A lens is always a lens group consists of one or more pieces of optical glass, and the basic units are concave lens, convex lens, or a combination of the concave lens and the convex lens.

The principle of generating the image by the imaging hardware maybe projecting collected optical signals to the image sensor in the imaging hardware, and converting the optical signals to electrical signals and then quantifying the electrical signals to obtain the image by the image sensor.

The character distance may be a focal distance, i.e., a distance between the apparatus and a focal plane of the apparatus. When the scene of the image includes a plurality of objects (i.e., service objects), the focal plane may locate in where an object is. Therefore, the character distance may be a distance between the apparatus and the service object. Different character distance may correspond with different depth of field. Here, a depth of field, also called focus range or effective focus range, is the distance between the nearest and farthest objects in a scene that appear acceptably sharp in an image. A depth of field image may be an image that reflects a depth of field of the scene, i.e., objects of different distances from the apparatus 300 may have different sharpness in the image. The sharpness of an object depends on how far the object is from a focus plane of the apparatus 300. Those objects that are within the depth of field are acceptably sharp, whereas those objects who are outside the depth of field appear blurry in the image. A depth of field image may be a preview image detected in a depth of field range. It may be saved in a non-transitory storage medium of the apparatus 300, or alternatively, as a preview image, it may be written into a buffer memory or cache, but is not truly generated as a final version of image to store in the non-transitory storage medium of the apparatus 300.

The apparatus 300 may further operate under a multiple features state, which includes a predetermined number of different character distances (e.g., focal distance) of the apparatus. For example, the predetermine number of character distances may be an arithmetic sequence. Under the multiple features state, when the user presses the "start to record" or "start to take picture" button of the apparatus, the apparatus may drive its imaging hardware to shoot a predetermined number of (i.e., the plurality of) frames of images respectively corresponding to the predetermined number of character distance. Since the predetermined number of character distance is a sequence of different numbers, each of the predetermined number of frames of images may corresponds with a different depth of field.

According to an exemplary embodiment of the present disclosure, step 101 may include the following substeps:

Substep S11: Driving the imaging hardware to multiple feature states having multiple character distances.

Substep S12: Driving the imaging hardware to generate one-frame or the plurality of frames of image for the object in the multiple feature states.

In the embodiment of the present disclosure, an image application may provide a specific control or another triggering manner. When a user triggers the triggering manner, the image application may drive the imaging hardware to use the multiple character distances to generate the plurality of frames of image for the object.

The object may be one or more objects in real life, for example, a building, a plant, and the like. The objects are distributed in different locations, and usually may reflect light to the imaging hardware, so the image generated by the imaging hardware may reflect information about the object.

In the embodiment of the present disclosure, the character distance may be a distance between an optical device and an external object.

In an implementation, the imaging hardware may have a motor that controls movement of the imaging hardware. The motor may move according to different current values. Each time the motor moves, the imaging hardware moves a short distance in millimeter or micron, and when the imaging hardware stops at a new location, the character distance changes and the imaging is performed by using one or more character distances.

Step 102: Displaying a preview image of one frame of image of the plurality of frames of image and waiting for a user selection of a first focal region on the image.

In an embodiment of the present disclosure, if one or more frames of image are generated, any frame may be selected therefrom to be displayed to let the user select a first focal region.

Step 103: When receiving the user selection of the first focal region in the displayed preview image, searching and/or determining, in each frame of the plurality of frames of images, a second focal region corresponding to the first focal region in the displayed preview image.

In an implementation, the image application may provide a selection box for the user to select the first focal region. The shape and size of the selection box may be a default shape, or may be defined by the user. The user may move the selection box over the displayed preview image to select a candidate location that the user wishes the apparatus to focus on. Further, the user may confirm his/her selection by a predetermined operation such as clicking the selection box and the like. When the user confirms his/her selection, the apparatus may determine the candidate location as the first focal region.

Because the size and resolution of the displayed preview image may not necessarily the same as the actual plurality of frames of images, in order to determine the actual focal region (i.e., the second focal region) on the plurality of frames of images, the apparatus may determine the corresponding region of the first focal region in each of the plurality of frames of images, after determining the first focal region on the displayed preview image. Here, the corresponding region is the second focal region. To this end, the apparatus may first determine a relative position of the first focal region on the displayed preview image, and then find out a candidate region in the same relative position of each of the plurality of frames of images, and determine that the candidate region is the second focal region. In the event that the plurality of frames of images have the same size and resolution, the position of second focal region applies to every one of the plurality of frames of images.

According to an exemplary embodiment of the present disclosure, step 103 may further include the following substeps:

Substep S21: Calculating a relative position of the first focal region in the displayed preview image.

Substep S22: Obtaining the second focal region located in the relative position in each frame of the image.

In general, the shape of the first focal region is the same as that of the generated image. However, because resolutions of the generated image are different, the number of pixels included in the generated image is inconsistent with the number of pixels in a first candidate region, so area discrepancy is generated, and thus a proportional relationship between heights and a proportional relationship between widths are derived.

For example, if the resolution of a frame of image is width×height=3264×2448 pixels, and the resolution of its corresponding displayed preview image is width×height=1440×1080 pixels, then the proportional relationship between widths of the frame of image and its displayed preview image is 102/45 and the proportional relationship between their heights is 102/45. Accordingly, if the character coordinates (e.g., the coordinate of the upper left corner) of the first region is (width, height)=(90, 180) pixels, then the coordinate of the corresponding second focal region on the frame of image is (width, height)=(204, 408) pixels.

Step 104: Calculating a sharpness coefficient between pixels located in the second focal region in each frame of the image.

Here, the sharpness coefficient between pixels is a measurement that reflects how sharp an image in the image area, i.e., whether an object in the image area are acceptably focused by the apparatus. For example, the sharpness coefficient between pixels in an image area may be contrast, information entropy, grayscale gradient, or a combination thereof of the pixels in the image area. The higher the contract, the information entropy, and/or the grayscale gradient, the higher the sharpness coefficient between the pixels in the image area. The lower the contract, the information entropy, and/or the grayscale gradient, the lower the sharpness coefficient between the pixels in the image area.

Taking the grayscale gradient as an example to measure the sharpness coefficient, to identify a target image area, the apparatus 300 may traverse through the entire pixels in a frame of image and calculate grayscale gradient among the pixels in the image areas of the frame of image. The apparatus may determine that the sharpness coefficient between pixels in an image area is small if the grayscale gradient (grayscale change) is small. On the other hand, the apparatus may determine that the sharpness coefficient between pixels in the image area is large if the grayscale gradient is large. Thus based on the grayscale gradient, the apparatus 300 may identify, from a frame of depth of field image, one or more target image areas within which the sharpness coefficient between pixels is above a preset sharpness threshold. In actual implementation, this means a target image area includes a point where an object is sharply focused by the apparatus. Therefore, a target image area may be part or all of an object in an image that stands out from its surrounding area in the image, by shape, color, pattern, and/or brightness etc., so that the apparatus 300 may identify the target image area from the frame of depth of field image.

Image with an appropriate character distance includes more information, which helps people better differentiate details of the image. Details imply that the image has a differentiable edge and a strong local grayscale change, and the grayscale changes more dramatically.

The gradient value may be calculated by using a gradient function such as a Tenengrad function, an energy gradient function, a Brenner function, a variance function, and the like.

During image processing, the gradient function is usually used to extract edge information. Image with an appropriate character distance and an image with a shaper edge should have a larger gradient function value.

The image entropy may be obtained by using an entropy function. The entropy function may be based on a premise that entropy of image with an appropriate distance is larger than entropy of image with an inappropriate (too short or too long) character distance.

According to an exemplary embodiment of the present disclosure, step 104 may include the following substeps:

Substep S31: Dividing each frame of the image into multiple image regions.

Each frame of the plurality of frames of images may be divided in a consistent division manner, such as using a grid to evenly divide a frame into a predetermined number of image areas. Alternatively, each frame of the plurality of frames of depth of field images may also be divided in an inconsistent division manner, such as dividing a frame into image areas into various sizes and/or various shapes (e.g., square, circular, triangle, etc.). Moreover, this embodiment of the present disclosure does not limit the manner, number and shapes (for example, a square, a circle, and a triangle) of the image areas divided in each frame of the plurality of frames of depth of field images. For example, the apparatus may divide a frame of image into a center region and a peripheral region, and then further divide the center region and the peripheral region into more image regions. Using a finer grid, the apparatus may divide the center region at higher resolution, and using a coarser grid the apparatus may divide the peripheral region at a lower resolution.

According to an exemplary embodiment of the present disclosure, substep S31 may include the following substeps:

Substep S311: Dividing each frame of the image into a first image region and a second image region.

In the embodiment of the present disclosure, the divided image region includes the first image region and the second image region. The first image region may be located at the center of each frame of image, and the second image region may be located in a surrounding area of the first image region. Moreover, the apparatus may further divide each of the first image region and the second image region into more image regions. The first region may be divided with higher resolution than the second region.

It should be noted that the center location and the surrounding location (or peripheral location) are relative. The center location is located in the center area of the image and is located inside the surrounding location, and the surrounding location is outside the center location.

Actual locations and region sizes of the center location and the surrounding location may be set by a person skilled in the art according to actual situations, for example, the center may be in the center of the image, or may be on the left/right of or above/below the center of the image, and the like, which is not limited in the embodiment of the present disclosure.

In another situation, the first image region may be located at a golden ratio location (approximately 0.618) of each frame of the image, and the second image region may be located outside the second image region to improve the differential precision of the golden ratio location.

In actual application, the user is used to set the object surround the center location or the golden ratio location, and thus the differential precision of the center location and the golden ration location may be higher, so as to try to detect the object.

Of course, the foregoing dividing manners are merely examples. During implementation of the embodiment of the present disclosure, another dividing manner such as an average vertical and horizontal dividing manner may be set according to actual situations, which is not limited in the embodiment of the present disclosure. In addition, besides the foregoing another dividing manner, a person skilled in the art may also use other dividing manners according to actual situations, which is also not limited in the embodiment of the present disclosure.

In addition, besides the first image region and the second image region, the divided region may also include other image regions, for example, dividing four corners of the image into third image regions, and the like, which is also not limited in the embodiment of the present disclosure.

Substep S32: Calculating, for each frame of the image, a sharpness coefficient between pixels in the one or multiple image regions.

Substep S33: Calculating, for each frame of the image, the sharpness coefficient between the pixels in the second focal region by using a sharpness coefficient between pixels in an image region at least partially overlapping the second focal region.

To this end, the apparatus 300 may identify the image regions that are within or overlap the second focal region, and then taking these image regions as candidate image regions. The apparatus then may traverse through the candidate image regions and calculate the sharpness coefficient of each candidate image region. Alternatively, the apparatus may traverse through all image regions of the frame of image and calculate the sharpness coefficient thereof.

If there is only one image region is in or overlap with the second focal region, then the apparatus may take the sharpness coefficient value of the single image region as the sharpness coefficient value of the second focal region. If, however, there are multiple candidate image regions in or overlap with the second focal region, the apparatus may calculate a sharpness coefficient value of the second focal region based on the multiple candidate region. For example, the apparatus may take a summation or weighted summation over the sharpness coefficient values of the multiple candidate image regions. The value of the weight for the sharpness coefficient value of each candidate image region may be predetermined. For example, the value of the weight may be determined based on a distance of the corresponding image region to the center of the second focal region. The closer an image region to the center of the second focal region, the higher the corresponding weight is for the sharpness coefficient of the image region.

Step 105: From the plurality of frame of images, when the sharpness coefficient of one frame of image is greater than a preset sharpness threshold, selecting the frame of image as a target image.

The sharpness threshold may be a preset value, and if in a frame of image the corresponding sharpness coefficient between the pixels of the second focal region exceeds the sharpness threshold, the apparatus may determine that the character distance corresponding to the frame of image to which the second focal region belongs is appropriate and the quality of the image is satisfactory. Accordingly, the apparatus may take the frame of image as the target image. Naturally, a target image includes at least one object properly focused in the second focal region.

Here, the sharpness coefficient and the sharpness threshold is just an example to shown the spirit of the present application. One of ordinary skill in the art may also use an image grayscale coefficient and a grayscale threshold pair, an image gradient and a gradient threshold pair, or an image entropy and an entropy threshold pair to measure and select the target image.

When the sharpness coefficient exceeds the preset sharpness threshold, the image grayscale change may be smaller than the image grayscale threshold, the image gradient value may be smaller than the image gradient threshold, and the image entropy may be smaller than the image entropy threshold.

It should be noted that among the plurality of frames of images, it is possible that there is no second focal region of which the corresponding sharpness coefficient exceeds the preset sharpness threshold; it is possible that there is only one second focal region of which the sharpness coefficient exceeds the preset sharpness threshold; and it is also possible that there are multiple second focal regions of which the sharpness coefficients exceed the preset sharpness threshold. In an implementation, the apparatus may select only 1 frame of image from those who the sharpness of the second focal region exceed the preset sharpness threshold for further processing, as shown below. Alternatively, the apparatus may select all frame of images that meets the sharpness requirement as set forth above for the further processing.

According to an exemplary embodiment of the present disclosure, the method may further include the following steps:

Step 106: Performing blur processing on a region outside the second focal region in the target image.

For image with an appropriate character distance, the scene is sharply recorded in the target image. Therefore, differences between pixels in the target image are relatively large. The apparatus may perform a blur process to blur a region outside the second focal region in the target image. The blur process may be a mathematical algorithm (such as Gaussian algorithm) and may reduce the differences between a pixel and pixels surrounding it.

According to an exemplary embodiment of the present disclosure, step 106 may include the following substeps:

Substep S41: Calculating a distance between pixels of the object in the target image and the imaging hardware of the apparatus.

Because in the target image includes at least one object, the apparatus may identify the object from the pixels in the image and calculate the distances between each pixel of the object and the apparatus (imaging hardware). Note that since the object in the scene may be a 3-D structure, pixels of the object on the target image may associate with different distances to the apparatus. Thus the distance of a pixel of the object on the target image may or may not be the character distance of the target image.

To this end, the apparatus may first select two frames of image from the plurality of frames of images, wherein foreground and background in each of the two frames of images are clearly distinguishable. Because each frame of image in the plurality of frames of images is corresponding to a different character distance, the apparatus may then determine the distance of the object to the apparatus based on the two frames of images.

For example, the plurality of frames of images may be seven frames of image A0 to A7, and the corresponding character distances of the seven frames increases in sequence from A0 to A7, that is, A0 is a frame of image having the minimum character distance and A7 is a frame of image having the maximum the character distance. A0 and A7 may be selected to calculate a distance between the object corresponding to a pixel in A0 and the imaging hardware, and A1 and A7 may be selected to calculate a distance between the object corresponding to a pixel in A1 and the imaging hardware, and so on.

Step S43: Performing, according to the distances, the blur processing on pixels outside the second focal region.

The blur processing is usually used to reduce noise and levels of detail of the image. A visual effect of an image generated by using a blur technology is like viewing the image through a translucent screen.

In the embodiment of the present disclosure, the blur processing may be performed pixel by pixel based on the distances between the object in the actual scene that corresponds to the pixel and the imaging hardware, that is, a blur degree of each pixel outside the second focal region may be controlled according to the distance between the object that correspond to the pixel and the imaging hardware. A longer distance between the object corresponding to the pixel and the imaging hardware indicates a higher blur degree, and a shorter distance between the object corresponding to the pixel and the imaging hardware indicates a lower blur degree.

In a specific implementation, Gaussian blur may be used to perform the blur processing.

From the view of mathematics, a Gaussian blur process of the image may be a convolution between the image and normal distribution.

According to an exemplary embodiment of the present disclosure, the following step may also be included:

Step 106: Displaying all the target images.

In the embodiment of the present disclosure, the target image may be the target image before the blur processing or the target image after the blur processing. They are output to the user to view, and the user may select an image therefrom he/she wishes to keep. The apparatus may save the selected target image in the non-transitory storage medium of the apparatus as a final image of the scene. The remainder target image may be saved for future use or may be discarded.

In the exemplary embodiments of the present disclosure, when a request to generate image is received, the apparatus 300 may drive the imaging hardware to use multiple character distances to generate a plurality of frames of images for an object or a scene that includes the object; when a first focal region is determined in the displayed preview image, a second focal region associated with the first focal region in each frame of the image is searched; and image of which the sharpness coefficient exceeds a preset sharpness threshold is selected to obtain target image; and an electronic device generates one or more frames image at once, and then obtains the target image based on a candidate region. During this process, a user may select different character distances in the image by implementing only one generation operation, and does not need to start the image application and drive the imaging hardware again, thereby significantly improving operation simplicity and shortening operating time.

It should be noted that, for brevity, the foregoing method exemplary embodiments are described as a series of action combinations; however, a person skilled in the art should understand that the exemplary embodiments of the present disclosure are not limited to the described action sequence, because according to the exemplary embodiments of the present disclosure, some steps may be performed in another sequence or performed simultaneously. Moreover, a person skilled in the art should also understand that the exemplary embodiments described in the specification all belong to exemplary embodiments, and the involved actions and modules are not necessarily required by the present disclosure.

Figure 2:
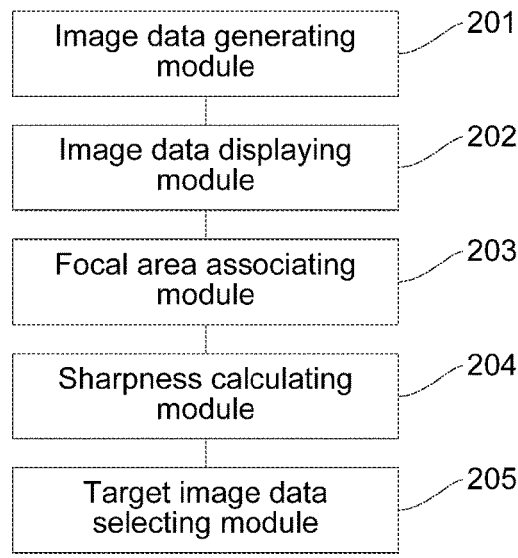
FIG. 2 is a structural block diagram of an apparatus embodiment for selecting target image according to the present disclosure.

FIG. 2 shows a structural block diagram of an apparatus embodiment for selecting target image according to the present disclosure. The apparatus may be the apparatus 300, which may include a processor and imaging hardware, such as a camera and a storage medium with an image application stored therein as a set of instructions. When the processor executes the image application, the processor may direct the imaging hardware to perform the above-introduced methods. In an exemplary embodiment, the imaging hardware and the processor may include the following modules:

An image generating module 201, configured to drive, when a request to generate image is received, imaging hardware to use multiple character distances to generate the plurality of frames of image for a object;

An image displaying module 202, configured to display one-frame image of the plurality of frames of image;

A focal region associating module 203, configured to search, when a first focal region is determined in the displayed image, a second focal region associated with the first focal region in each frame of the image;

A sharpness calculating module 204, configured to calculate a sharpness coefficient between pixels located in the second focal region in each frame of the image; and A target image selecting module 205, configured to select, when the sharpness coefficient exceeds a preset sharpness threshold, image to which the sharpness coefficient belongs as target image.

In an implementation, the imaging hardware has an optical component. The character distance may be a distance between the optical component and the object.

According to an exemplary embodiment of the present disclosure, the image generating module 201 may include the following submodules:

A first driving submodule, configured to drive the imaging hardware to multiple feature states having multiple character distances; and A second driving submodule, configured to drive the imaging hardware to generate the plurality of frames of image for the object in the multiple feature states.

According to an exemplary embodiment of the present disclosure, the focal region associating module 203 may include the following submodules:

A relative position calculating submodule, configured to calculate a relative position of the first focal region in the displayed image; and A second focal region obtaining submodule, configured to obtain the second focal region located in the relative position in each frame of the image.

According to an exemplary embodiment of the present disclosure, the sharpness calculating module 204 may include the following submodules:

A dividing submodule, configured to divide each frame of the image into multiple image regions;

A first calculating submodule, configured to calculate, for each frame of the image, a sharpness coefficient between pixels in the multiple image regions; and A second calculating submodule, configured to calculate, for each frame of the image, the sharpness coefficient between the pixels in the second focal region by using a sharpness coefficient between pixels in an image region at least partially overlapping the second focal region.

According to an exemplary embodiment of the present disclosure, the dividing submodule may include the following submodules:

An image region dividing submodule, configured to divide each frame of the image into multiple first image regions and multiple second image regions;

Where the first image region may be located around a center location of each frame of the image, and the second image region may be located at the center location of each frame of the image; or the second image region may be located at a golden ratio location of each frame of the image, and the first image region may be located outside the second image region.

According to an exemplary embodiment of the present disclosure, the apparatus may further include the following modules:

A blur processing submodule, configured to perform blur processing on a region outside the second focal region in the target image.

According to an exemplary embodiment of the present disclosure, the blur processing submodule may include the following submodules:

A distance calculating submodule, configured to calculate a distance between the object corresponding to a pixel in the target image and the imaging hardware; and A pixel blur submodule, configured to perform, according to the distance, the blur processing on a pixel outside the second focal region.

According to an exemplary embodiment of the present disclosure, the apparatus may further include the following modules:

A displaying module, configured to display the target image.

The apparatus exemplary embodiments are substantially similar to the method exemplary embodiments and therefore are only briefly described, and reference may be made to the method exemplary embodiments for the associated part.

It should be noted that the exemplary embodiments in this specification are all described in a progressive manner. Description of each of the exemplary embodiments focuses on differences from other exemplary embodiments, and reference may be made to each other for the same or similar parts among respective exemplary embodiments.

A person skilled in the art should understand that the exemplary embodiments of the present disclosure may be provided as a method, an apparatus, or a computer program product. Therefore, the exemplary embodiments of the present disclosure may use a form of a hardware embodiment, a software embodiment, or an exemplary embodiment combining software and hardware. In addition, the exemplary embodiments of the present disclosure may use a form of a computer program product implemented on one or more computer available storage media (including but not limited to a disk memory, a CD-ROM, an optical memory, and the like) including computer available program code.

The exemplary embodiments of the present disclosure are described with reference to flowcharts and/or block diagrams of the method, the terminal device (system), and the computer program product in the exemplary embodiments of the present disclosure. It should be understood that computer program instructions can implement each process and/or block in the flowcharts and/or block diagrams and a combination of processes and/or blocks in the flowcharts and/or block diagrams. These computer program instructions may be provided to a general-purpose computer, a dedicated computer, an embedded processor, or a processor of another programmable data processing terminal device to generate a machine, so that an apparatus configured to implement functions specified in one or more processes in the flowcharts and/or one or more blocks in the block diagrams is generated by using instructions executed by the computer or the processor of another programmable data processing terminal device.

These computer program instructions may also be stored in a computer readable memory that can guide a computer or another programmable data processing terminal device to work in a specific manner, so that the instructions stored in the computer readable memory generate a product including an instruction apparatus, where the instruction apparatus implements functions specified in one or more processes in the flowcharts and/or one or more blocks in the block diagrams.

These computer program instructions may also be loaded into a computer or another programmable data processing terminal device, so that a series of operation steps are performed on the computer or another programmable data processing terminal device to generate processing implemented by a computer, and instructions executed on the computer or another programmable data processing terminal device provide steps for implementing functions specified in one or more processes in the flowcharts and/or one or more blocks in the block diagrams.

Although the exemplary embodiments of the present disclosure have been described, other changes and modifications to the exemplary embodiments can be made once a person skilled in the art has learned the basic creative concept. Thus, the appended claims intend to be explained as comprising the exemplary embodiments and all the changes and modifications within the scope of the exemplary embodiments of the present disclosure.

Finally, it should be noted that the relational terms herein such as first and second are used only to differentiate an entity or operation from another entity or operation, and do not require or imply any actual relationship or sequence between these entities or operations. Moreover, the terms "include", "comprise", and any variants thereof are intended to cover a non-exclusive inclusion. Therefore, in the context of a process, method, object, or terminal device that includes a series of elements, the process, method, object, or terminal device not only includes such elements, but also includes other elements not specified expressly, or may include inherent elements of the process, method, object, or terminal device. Unless otherwise specified, an element limited by "include a/an . . . " does not exclude other same elements existing in the process, the method, the object, or the terminal device that includes the element.

A method for selecting target image and an apparatus for selecting target image provided by the present disclosure are described above in detail. Specific examples are used in this specification to describe the principle and implementation manners of the present disclosure, but the foregoing descriptions of the exemplary embodiments are merely intended to facilitate understanding of the method and core idea of the present disclosure. Besides, a person of ordinary skill in the art may make alterations to the specific implementation manners and application scope according to the idea of the present disclosure. In conclusion, the content of this specification shall not be understood as a limitation on the present disclosure.

The invention claimed is:

1. An electronic device, comprising:
   imaging hardware;
   a storage medium including a set of instructions for generating image data; and
   a processor in communication with the storage medium, wherein when executing the set of instructions, the processor is directed to:
   drive the imaging hardware to obtain a plurality of frames of images of a scene including at least one object, each of the plurality of frames of images is associated with a character distance of a plurality of character distances of the electronic device;
   for each frame of the plurality of frames of images, calculate sharpness of the frame of image; and
   when the sharpness exceeds a preset sharpness threshold,
   select the frame of image as a target image; and
   display at least one of the target image to a user of the electronic device.

2. The electronic device according to claim 1, further comprising an optical component, and wherein each of the plurality of character distances is a distance between the optical component and an object of the at least one object in the scene.

3. The electronic device according to claim 1, wherein the processor is further directed to:
   display a preview image of the scene;
   receive a selection of a first focal region on the preview image from a user;
   determine a second focal region on the plurality of frames of images based on a position of the first focal region on preview image; and
   for each frame of image in the plurality of frames of images, determine sharpness of the frame of image in the second focal region and treat the determined sharpness as the calculated sharpness of the frame of image.

4. The electronic device according to claim 3, wherein a relative position of the second focal region in the plurality of frames of images equals a relative position of the first focal region in the preview image.

5. The electronic device according to claim 3, wherein to determine the sharpness of the frame of image in the second focal region the processor is further directed to:
   divide the frame of image into a plurality of image regions, so that at least one candidate image region from the plurality of image regions is at least partially within the second focal region;
   determine sharpness of the frame of image in each of the at least one candidate image region; and
   determine the sharpness of the frame of image in the second focal region based on the sharpness of the frame of image in the at least one candidate image region.

6. The electronic device according to claim 5, wherein to divide the frame of the image into the plurality of image regions the processor is further directed to:
   divide the frame of the image into a first region at a center of the frame of image and a second regions at a peripheral region of the first region; and
   divide the first region into a first plurality of image regions at a first resolution; and divide the second region into a second plurality of image regions at a second resolution lower than the first resolution.

7. The electronic device according to claim 5, wherein to divide the frame of the image into the plurality of image regions the processor is further directed to:
  divide the frame of the image into a first region at a golden ratio location of the frame of image and a second regions at a peripheral region of the first region; and
  divide the first region into a first plurality of image regions at a first resolution; and
  divide the second region into a second plurality of image regions at a second resolution lower than the first resolution.

8. The electronic device according to claim 3, wherein the processor is further directed to:
  perform a blur process on a region outside the second focal region in the target image.

9. The electronic device according to claim 8, wherein to perform the blur process, the processor is further directed to, for each pixel in the region outside the second focal region:
  calculate a distance between an object corresponding to the pixel and the imaging hardware; and
  perform, according to the distance, the blur process on the pixel according to the distance.

10. The electronic device according to claim 1, wherein the processor is further directed to:
  receive a selection of a final image from the at least one target image; and
  save the final image and discarding remainder of the at least one target image.

11. A method for selecting a target image, comprising:
  obtaining, by imaging hardware of an electronic device, a plurality of frames of images of a scene including at least one object, each of the plurality of frames of images is associated with a character distance of a plurality of character distances of the electronic device;
  for each frame of the plurality of frames of images,
    calculating, by the electronic device, sharpness of the frame of image; and
    when the sharpness exceeds a preset sharpness threshold, selecting, by the electronic device, the frame of image as a target image; and
  displaying, by the electronic device, at least one of the target image to a user of the electronic device.

12. The method according to claim 11, wherein the electronic device includes an optical component, and wherein each of the plurality of character distances is a distance between the optical component and an object of the at least one object in the scene.

13. The method according to claim 11, further comprising:
  displaying, by the electronic device, a preview image of the scene;
  receiving, by the electronic device, a selection of a first focal region on the preview image from a user;
  determining, by the electronic device, a second focal region on the plurality of frames of images based on a position of the first focal region on preview image; and
  for each frame of image in the plurality of frames of images, determining, by the electronic device, sharpness of the frame of image in the second focal region and treat the determined sharpness as the calculated sharpness of the frame of image.

14. The method according to claim 13, wherein a relative position of the second focal region in the plurality of frames of images equals a relative position of the first focal region in the preview image.

15. The method according to claim 13, wherein the determining of the sharpness of the frame of image in the second focal region comprises:
  dividing the frame of image into a plurality of image regions, so that at least one candidate image region from the plurality of image regions is at least partially within the second focal region;
  determining sharpness of the frame of image in each of the at least one candidate image region; and
  determining the sharpness of the frame of image in the second focal region based on the sharpness of the frame of image in the at least one candidate image region.

16. The method according to claim 15, wherein the dividing of the frame of the image into the plurality of image regions comprises:
  dividing the frame of the image into a first region at a center of the frame of image and a second regions at a peripheral region of the first region; and
  dividing the first region into a first plurality of image regions at a first resolution; and
  dividing the second region into a second plurality of image regions at a second resolution lower than the first resolution.

17. The method according to claim 15, wherein the dividing of the frame of the image into the plurality of image regions comprises:
  dividing the frame of the image into a first region at a golden ratio location of the frame of image and a second regions at a peripheral region of the first region; and
  dividing the first region into a first plurality of image regions at a first resolution; and
  dividing the second region into a second plurality of image regions at a second resolution lower than the first resolution.

18. The method according to claim 13, further comprising:
  performing, by the electronic device, a blur process on a region outside the second focal region in the target image.

19. The method according to claim 18, wherein the performing of the blur process comprises, for each pixel in the region outside the second focal region:
  calculating a distance between an object corresponding to the pixel and the imaging hardware; and
  performing, according to the distance, the blur process on the pixel according to the distance.

20. The method according to claim 11, further comprising:
  receiving, by the electronic device, a selection of a final image from the at least one target image; and
  saving, by the electronic device, the final image and discarding remainder of the at least one target image.

* * * * *